United States Patent Office 2,981,341
Patented Apr. 25, 1961

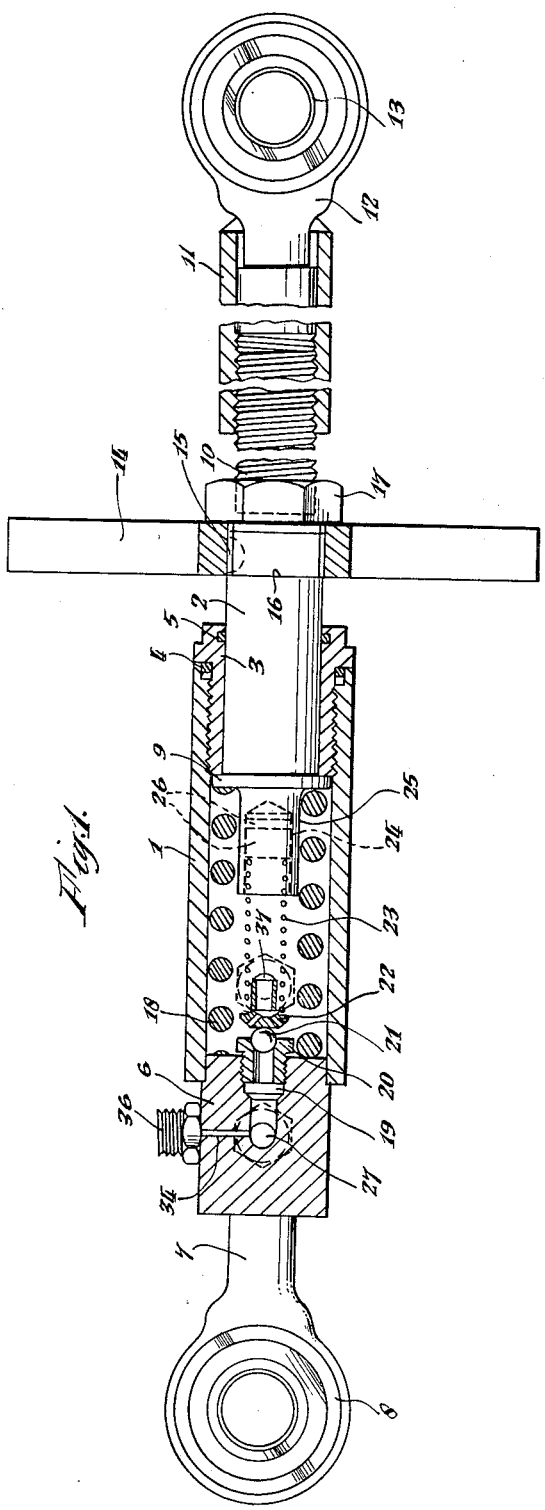

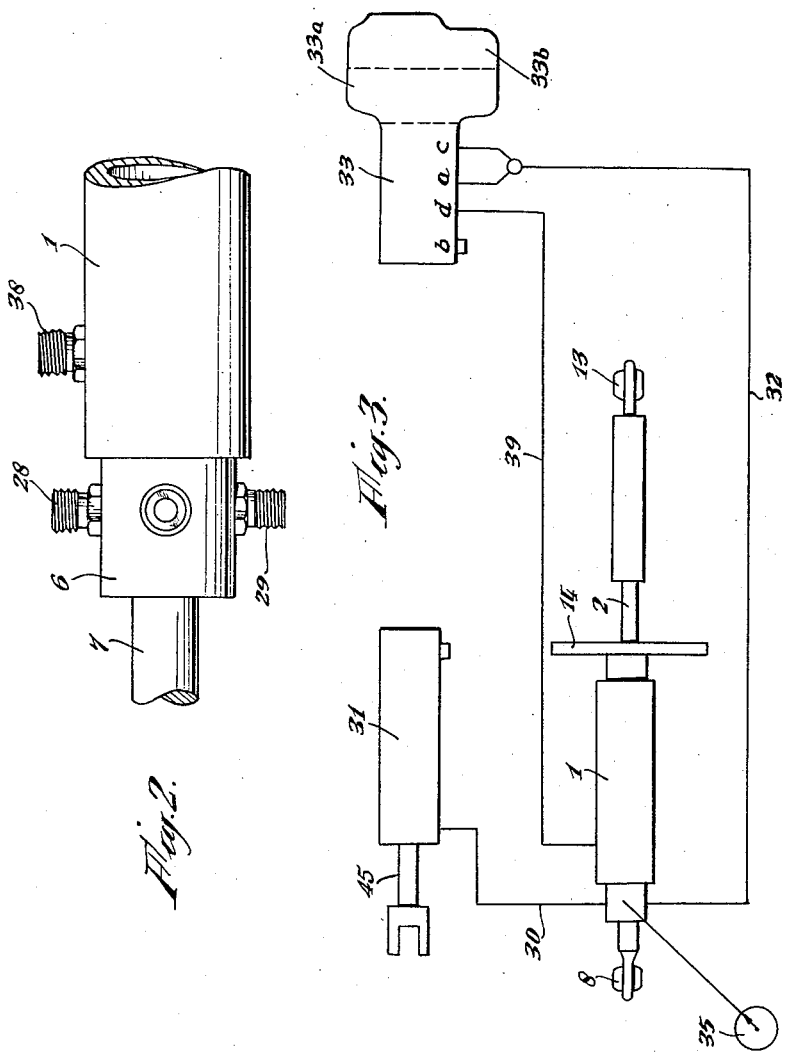

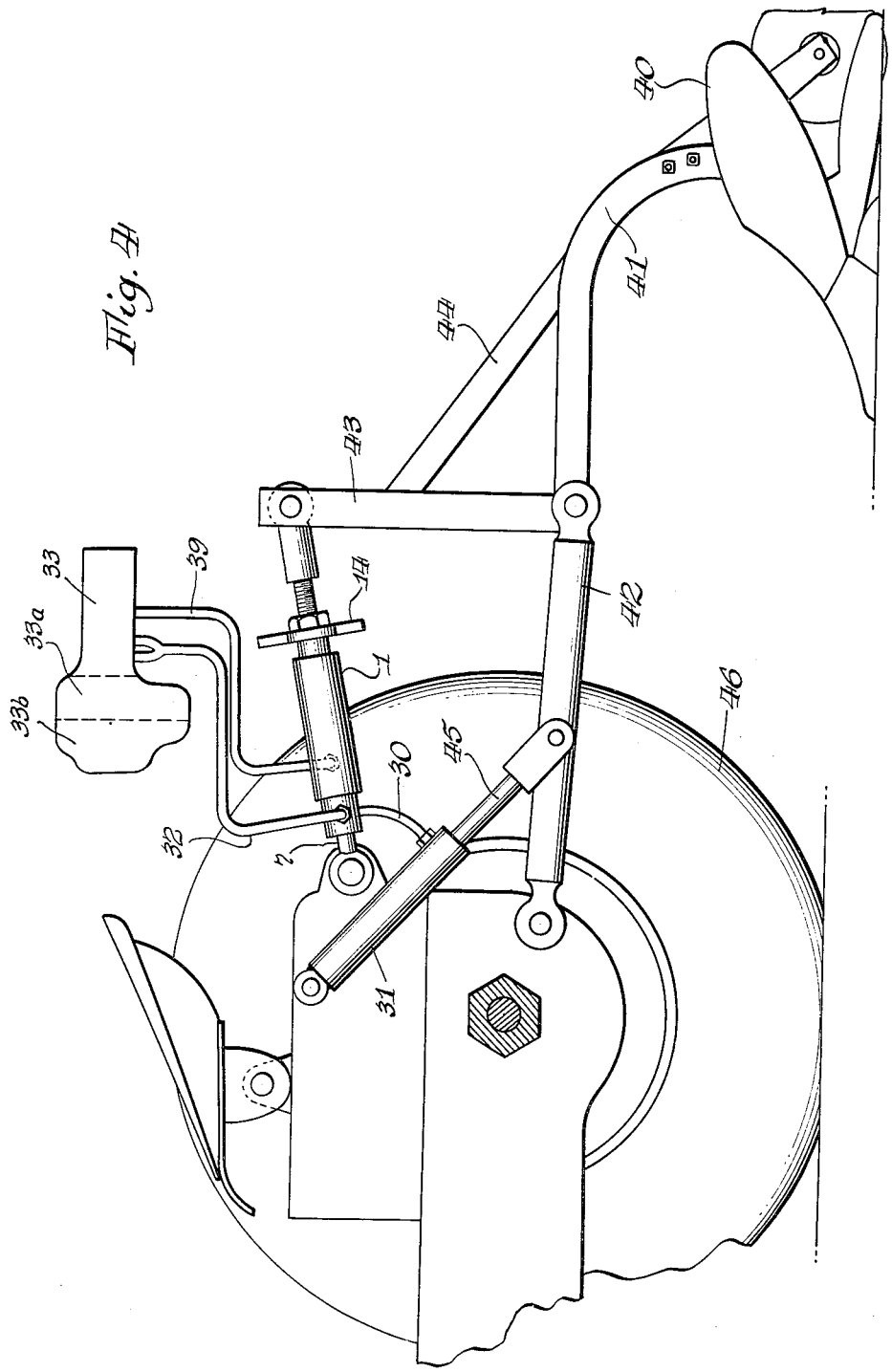

2,981,341
MEANS FOR EFFECTING LOAD TRANSFER IN TRACTOR IMPLEMENT ASSEMBLIES

Victor William Dilworth, Northampton, England, assignor to International Harvester Company, Chicago, Ill.

Filed Mar. 29, 1957, Ser. No. 649,454

Claims priority, application Great Britain Apr. 3, 1956

7 Claims. (Cl. 172—2)

This invention relates to means for effecting load transfer in tractor implement assemblies.

It is well-known that the tractive effort of a tractor, when used with ploughs and other agricultural implements imposing a substantial draft load, is limited by the incidence of slipping of the drive wheels of the tractor, particularly on soft ground, and that the tractive effort can be substantially increased within the limits of the available horse-power by increasing the loading on the drive wheels. It is also known that if part of the weight of the implement can be transferred to the tractor, the required increased loading on the drive wheels of the tractor can be obtained without increasing the weight of the tractor itself as by the addition of wheel weights.

In tractor implement assemblies wherein the implement is connected to the tractor by a linkage of the three-point type, the usual hydraulic power lift acting on the linkage can be controlled so that a lifting force less than that required to raise the implement from its working position can be exerted whereby part of the weight of the implement is transferred to the tractor for increasing the loading on the tractor drive wheels. Load transfer in this manner enables the available power of a tractor to be fully utilised so that a heavy and relatively expensive construction of tractor is unnecessary.

The present invention is concerned with a load transfer arrangement in which pressure of hydraulic fluid in the hydraulic lift system is controlled by a relief valve which by-passes the fluid supplied under pressure continuously from a pump and restricts the pressure in the hydraulic system to below that required to lift the implement from the ground.

Systems involving control of a hydraulic lift by by-passing the hydraulic fluid at relatively high pressure through a relief valve are limited to operating pressures which will not involve undue over-heating of the fluid due to the fluid being continuously forced through the restriction provided by the relief valve, and it has been found that, for this reason, control by a relief valve adjustably loaded according to variations in draft load, e.g. in response to movements of a draft-responsive member, is unsuitable for automatic depth control of implements carried by a three-point linkage, and wherein the implement is supported at a selected working depth by applying an appropriate pressure in the hydraulic lift system.

Systems embodying a high pressure relief valve therefore are primarily applicable for effecting load transfer in tractor implement assemblies wherein the implement is supported at a desired working depth by means other than the hydraulic lift system, e.g. a depth regulating wheel or skid.

It has before been proposed to provide a load transfer arrangement of the above character in which optional load transfer is obtainable by bringing into action a preset relief valve so that hydraulic fluid normally by-passed at low pressure is caused to build up a predetermined pressure in the hydraulic system less than that required to lift the implement from its working position. Particularly if this predetermined pressure is relatively high, i.e. approaches closely that required to lift the implement, there may be a tendency for forward pitching movements of the tractor consequent on inequalities in ground level to lift the implement at times from its working position and thereby cause deviation from a constant working depth. On the other hand, on rearward pitching movements of the tractor, the hydraulic lift may be temporarily inoperative for transfer of load to the tractor and intermittent wheel slip may occur.

The present invention has for its object to provide a simple and relatively inexpensive unit adapted to be readily applied to existing three-point linkages operated by a hydraulic power lift and enabling pressure in the hydraulic lift system to be controlled to exert a lifting force on the implement and consequent transfer of load to the tractor, to a variable extent in such manner that, while load transfer increases as draft load increases up to a point below that at which the hydraulic lift system would act to lift the implement from its working position, a measure of compensation for fore and aft pitching of the tractor with respect to the implement is provided to ensure that the normal working depth of the implement and a degree of load transfer is maintained.

According to the present invention, a link unit, adapted to be substituted for the existing top link of a three-point linkage of a tractor, comprises two parts slidable telescopically or otherwise with respect to one another to provide a link which is extensible and contractible, spring means disposed between said parts and reacting against contraction of the link unit, and a relief valve controlled by relative movement of said parts so that restriction to flow of fluid through said valve is increased on contraction of the link unit and vice versa.

The relief valve may be a ball or equivalent non-return valve loaded by means of a spring, the pressure of which is varied by relative movement of the parts of the link unit. Means may be provided for setting the valve loading spring to a predetermined initial pressure, and means also may be provided for adjusting the length of the link unit so that the plough or other implement can be positioned to operate correctly.

In a preferred embodiment, the link unit comprises a cylinder provided at one end with an axially disposed relief valve, the inlet of which communicates with means for the connection of a fluid pressure supply line, and the outlet of which discharges into said cylinder having an outlet for communication with a fluid return line, a coaxial rod member slidably mounted at the opposite end of the cylinder, stop means limiting outward and inward movement of said rod member from said cylinder, spring means housed in said cylinder and acting on said rod member against inward movement thereof, and a relief valve loading spring disposed between said rod member and said relief valve so that, on contraction of the link unit consequent on compression of said spring means, the pressure of the relief valve loading spring is increased, and vice versa. Adjustment of initial loading of the relief valve may be effected by the use of interchangeable spacer members between the valve loading spring and said rod member. The rod member may be adjustable in length by means of interengaging screw-threaded portions.

The link unit is provided at opposite ends with swivelling eyes of bushings of the conventional form used in three-point linkages.

The invention is hereinafter described, by way of example, with reference to the accompanying diagrammatic drawings, in which:

Fig. 1 is a longitudinal section illustrating one embodiment of load transfer means according to the invention;

Fig. 2 is a detail plan view of part of the link unit shown in Fig. 1;

Fig. 3 is a circuit diagram illustrating the manner in which the link unit is connected in the hydraulic lift system of a tractor; and Fig. 4 is a view in side elevation of the rear end of a tractor equipped with a three-point linkage and having a moldboard plow mounted thereon, and illustrating diagrammatically the application of the upper link of this invention to the three-point system.

In carrying the invention into effect according to one embodiment, and with reference to the accompanying diagrammatic drawings, the improved load transfer means according to the invention comprises a link unit adapted to be substituted for the existing top link of a three-point linkage. This link unit comprises a cylinder 1 and a rod member 2 slidable in a sleeve 3 screwed into an open end of the cylinder 1 and rendered fluid-tight by seals 4, 5. The other end of the cylinder 1 is closed by means of a member 6 which may be welded in position and is provided with an extension 7 carrying a swivelling bushing or eye 8. The rod member 2 has a flange 9 abutting the inner end of the sleeve 3 to limit outward movement of the rod member 2 from the cylinder 1 and comprises a screwed extension 10 and an internally screwed sleeve member 11 provided at its outer end with a fitting 12 carrying a swivelling bushing or eye 13. The rod member 2 may be rotated with respect to the sleeve 11 by means of a spider or wheel 14 locked to the rod member 2 by means of a key 15 and clamped against a shoulder 16 by a nut 17. The spider or wheel 14 also acts as a stop for inward movement of the rod 2.

A heavy helical spring 18 is housed in the cylinder and extends between the member 6 and the flange 9. The member 6 is provided with an axial bore 19 in which a seating 20 for a ball valve 21 is mounted, the ball valve being pressed on its seating by means of a fitting 22 with which one end of a valve loading spring 23 coacts. The other end of the spring 23 extends into a bore 24 in an inwardly extending axial extension 25 of the rod member 2, and in order to vary the initial loading on the spring 23, interchangeable spacer members 26 are interposed between the end of the spring 23 and the end of the bore 24.

The bore 19, which provides the inlet to the relief valve 21, communicates with a transverse passage 27 in the member 6 provided at its ends with coupling means 28, 29 for connection respectively to a pressure fluid supply conduit 30 leading to a ram cylinder 31 of a hydraulic lift on a tractor and a pressure fluid supply conduit 32 leading from the outlet of a control valve 33, which it may be understood is of conventional construction the details of which form no part of this invention and which is connected to a continuously operating pump indicated at 33a, receiving fluid from a reservoir 33b, both of which may be of any suitable form. It should be understood that any reservoir, pump and valve arrangement may be used which meets the requirement of opening one of the ports a or c to fluid under pressure from the pump so that the fluid can flow to ram 31 to lift the implement. Having satisfied the requirement of opening, say, port c, it being understood that oil is flowing to the pump and the pathway from pump to port c is open, and allowing the fluid to retract the cylinder 31 to raise the implement, it should also be understood that when the implement is fully lifted, cut-off means are provided, but not shown, for barring the delivery of fluid to and from the pump and to the cylinder 31 and for closing return port d. As stated before, such means form no part of the invention claimed herein, and it may be noted that similar means are disclosed, for example, in the U.S. patent to Ferguson 2,118,180, dated May 24, 1938, which also suggests the use, if desired, of means for protecting the system against excess pressures. Another control valve of the same type as valve 33 is shown in British Patent No. 725,288, issued January 16, 1953. A passage 34, also communicating with the bore 19, may be provided for the connection of a pressure gauge 35 fitted to coupling means 36. An outlet 37 in the wall of the cylinder 1 is provided with coupling means 38 for connection to a fluid return line 39 leading to the exhaust side of the valve 33, from whence it returns to a sump or reservoir of the pump.

In operation the link unit is connected in place of the existing top link between the tractor and the implement. When the implement has been lowered to working position by releasing pressure fluid from the hydraulic lift system by suitable control means 33, the spider or wheel member is rotated to adjust the effective length of the link unit so that under normal draft load conditions on level ground the plough or other implement will work correctly and consequent contraction of the link unit by compression, due to draft load, will exert loading on the relief valve up to a pressure indicated by the gauge 35 less than that required to lift the implement from working position. The loading is such that any increase in draft load normally encountered will not cause increase of pressure in the hydraulic system above the limit referred to. The working depth of the implement is determined by the setting of a depth-regulating wheel or skid. If the tractor pitches forwardly, due to inequalities in ground level, consequent extension of the link unit reduces the loading on the relief valve and consequently the lifting force exerted by the hydraulic lift, thereby counteracting any tendency for the implement to be temporarily raised from its normal working position. If the tractor pitches rearwardly, increased contraction of the link unit increases the loading on the relief valve and thereby increases the degree of pressure applied to the hydraulic lift and thereby tends to increase the degree of lifting force on the implement and consequent load transfer to the tractor.

As pointed out before, the control valve structure is conventional and the details of its construction per se form no part of this invention. For instance, in Fig. 4, it may be understood control valve 33 is shown separated from the tractor for purposes of illustration. It may also be understood that it is customary to provide in connection with such a control valve a control lever, not shown, which can be manipulated to open one of the outlets marked c or a or to close the return inlet d in the control valve.

The application of an implement in the form of a plow 40 to the three-point system of this invention is shown in Fig. 4, the plow support or beam 41 being connected to the lower links 42 of the three-point system. While only one link 42 is visible in the drawing it may be understood that a pair of laterally spaced links 42 are connected between the tractor and the implement. An upright 43 is braced by a strap 44 and is connected at its upper end to the tractor by the link 1.

Now, if we assume that the implement is to be lifted on the tractor for transport, the tractor operator actuates the control valve to open outlet c or a and close return port d to cause fluid to flow through line 32 to port 29 of link 1. The entire system is then under pressure, fluid cannot pass through valve 21, conduit 39 and back to the valve 33, so that valve 21 is by-passed and fluid flows directly through passage 27 and conduit 30 to cylinder 31.

When the implement is in operation with the plow bottom 40 in the ground, oil flows from outlet c or a of the control valve through conduit 32 to port 29 of link 1 where it enters passages 27 and 34, the latter leading to the gauge 35, conduit 30 leading to cylinder 31, and past valve 21 through conduit 39 to the control valve and back to the reservoir. Since passage of oil through valve 21 is opposed by spring 23, the oil pressure on the side of the valve adjacent passage 27 is higher than on the other side thereof, and this higher oil pressure applied to cylinder 31 where oil volume remains substantially constant through conduit 30 applies a lifting force to the implement which is not sufficient to elevate it but only to take some of the weight therefrom, this weight being, in turn, applied to the tractor rear wheels 46 to increase the traction thereof.

As fully explained hereinbefore, if the tractor front end drops, due to unevenness in the ground surface, the effect is to cause link 1 to extend, lowering the pressure against the entering side of valve 21 and reducing the lifting force exerted by cylinder 31. Conversely, if the rear end of the tractor drops the effect is to cause link 1 to contract, increasing the load on valve 21 and therefore the oil pressure entering cylinder 31, thus increasing the lifting force applied to the implement and the weight transferred to the tractor.

It will be appreciated that although the invention is particularly applicable for obtaining load transfer in tractor implement assemblies wherein the depth of the implement is regulated by a depth control wheel or skid, the link unit according to the invention may be used in connection with light implements or implements in which a suitable proportion of the weight is otherwise counter-balanced so that the pressure required in the hydraulic lift system for supporting the implement at a desired working depth without a ground wheel or skid is sufficiently low to avoid difficulties due to heating up of the hydraulic fluid. In such applications, the link unit can function in a manner known per se to provide a measure of automatic depth control. Automatic depth control obviously involves load transfer which is the primary function of the link unit described.

I claim:

1. In implement attaching apparatus of the three-point type for a tractor having a source of fluid under pressure and a power cylinder receiving fluid from the source to lift the implement, the combination with a pair of lower draft links between the tractor and implement of an extensible and contractable upper link unit comprising relatively slidable telescopic parts, one of which is connected to the tractor and the other to the implement, feed conduit means connected between said source and said link unit and between said link unit and said power cylinder for feeding fluid from the source through said link unit to the power cylinder, return conduit means connected between said link unit and said source for returning the fluid to the source, a valve in said link unit between said feed conduit means and said return conduit means normally accommodating a flow of fluid from the feed conduit to the return conduit, and means responsive to the extension and contraction of said link unit and cooperative with said valve to increase and restrict the flow of fluid through the valve.

2. The invention set forth in claim 1, wherein a spring is disposed between the relatively slidable parts of said link unit to resist contraction thereof.

3. The invention set forth in claim 1, wherein said valve is a relief valve, a closure member in said valve normally held open during operation of the implement by the pressure of fluid flowing therethrough and valve loading spring means in said link unit and engageable with the closure member to yieldably bias the latter toward a closed position, the pressure on said closure member exerted by said valve loading spring being variable by the extension and contraction of the valve loading spring.

4. The invention set forth in claim 3, wherein means is provided for adjusting the load on said spring to a predetermined pressure.

5. The invention set forth in claim 1, wherein one of said relatively slidable parts has a passage therethrough connected to the feed conduit for said power cylinder and to the inlet side of said valve and a hollow chamber, and the other of said link unit relatively slidable parts is a rod slidable in said hollow chamber, the outlet side of said valve discharging into said chamber for return to the power source, a closure member for the valve, and a spring engageable with said rod and with said closure member for holding the latter in closed position and for resisting the discharge of fluid through the valve, the resistance exerted by said spring loaded closure member being responsive to the extension and contraction of the rod in said chamber.

6. The invention set forth in claim 5, wherein the valve closure member is a ball and resistance to passage of fluid therethrough is provided by a spring engaging the ball and the rod, pressure of fluid on the inlet side of the valve being increased and decreased by the pressure of the spring on the ball in response to the extension and contraction of the link.

7. In implement attaching apparatus of the three-point type for a tractor having a source of fluid under pressure and a power cylinder receiving fluid from the source to raise the implement, the combination with a pair of lower draft links connected between the tractor and implement of an upper link unit connected between the tractor and implement and extensible and contractable in response to variations in draft load on the implement, comprising a link member having a chamber and a rod telescopically slidable therein, a spring in the chamber bearing against the chamber and the rod to yieldably resist contraction of the parts, conduit means connecting said source to said power cylinder for feeding fluid under pressure thereto, a passage in the link member connected in said conduit means, a relief valve connecting said conduit means to said chamber for the discharge of fluid to the chamber, and a spring in the chamber connected between the rod and said valve and responsive to the sliding of the rod in the chamber for resisting the discharge of fluid into the chamber.

References Cited in the file of this patent

UNITED STATES PATENTS

| 2,455,727 | Bunting | Dec. 7, 1948 |
| 2,750,862 | Garmager | June 19, 1956 |

FOREIGN PATENTS

| 74,547 | Denmark | Aug. 11, 1952 |
| 1,075,023 | France | Apr. 7, 1954 |
| 728,858 | Great Britain | Apr. 27, 1955 |